US010593250B2

(12) United States Patent
Zeng

(10) Patent No.: US 10,593,250 B2
(45) Date of Patent: Mar. 17, 2020

(54) LIQUID CRYSTAL DISPLAY AND METHOD OF IMPROVING COLOR SHIFT ARISED FROM LARGE VIEW ANGLE

(71) Applicant: Shenzhen China Star Optoelectronics Technology Co., Ltd., Shenzhen, Guangdong (CN)

(72) Inventor: Dekang Zeng, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 385 days.

(21) Appl. No.: 15/300,419

(22) PCT Filed: Aug. 3, 2016

(86) PCT No.: PCT/CN2016/093002

§ 371 (c)(1),
(2) Date: Sep. 29, 2016

(87) PCT Pub. No.: WO2017/210982

PCT Pub. Date: Dec. 14, 2017

(65) Prior Publication Data

US 2018/0182277 A1 Jun. 28, 2018

(30) Foreign Application Priority Data

Jun. 7, 2016 (CN) .......................... 2016 1 0404582

(51) Int. Cl.
*G06F 3/038* (2013.01)
*G09G 3/20* (2006.01)
*G09G 3/36* (2006.01)

(52) U.S. Cl.
CPC ......... *G09G 3/2007* (2013.01); *G09G 3/3607* (2013.01); *G09G 3/3674* (2013.01);
(Continued)

(58) Field of Classification Search
CPC . G06F 3/038; G09G 5/00; G09G 3/36; G09G 3/10
See application file for complete search history.

(56) References Cited

U.S. PATENT DOCUMENTS

2003/0169248 A1* 9/2003 Kim .................... G09G 3/3611 345/204
2007/0001964 A1 1/2007 Lee
(Continued)

FOREIGN PATENT DOCUMENTS

CN 1737897 A 2/2006
CN 102237066 A 11/2011
(Continued)

*Primary Examiner* — Pegeman Karimi
(74) *Attorney, Agent, or Firm* — Andrew C. Cheng

(57) ABSTRACT

A liquid crystal display (LCD) includes a timing controller, a source driver IC, and a liquid crystal panel. The timing controller transmits data including a gamma value corresponding to a pending frame to the source driver IC. The source driver IC generates grayscale voltages supplied to pixels of a liquid crystal panel based on a gamma value corresponding to the pending frame and the grayscales of the pixels corresponding to the pending frame. The liquid crystal panel shows the pending frame based on the grayscale voltages supplied to each of the pixels. The gamma value corresponding to the pending frame is different from the gamma value corresponding to adjacent frames. Adopting the LCD can greatly lower the color shift from a large view angle and enlarge a view angle without increasing the production costs or lowering the transmittance of the liquid crystal panel.

8 Claims, 3 Drawing Sheets

(52) U.S. Cl.
CPC ......... *G09G 3/3688* (2013.01); *G09G 3/3696* (2013.01); *G09G 2310/027* (2013.01); *G09G 2310/08* (2013.01); *G09G 2320/028* (2013.01); *G09G 2320/0242* (2013.01); *G09G 2320/0276* (2013.01); *G09G 2320/0673* (2013.01)

(56) References Cited

U.S. PATENT DOCUMENTS

| | | | | |
|---|---|---|---|---|
| 2008/0122814 | A1* | 5/2008 | Shin | G09G 3/3648 345/204 |
| 2009/0262106 | A1* | 10/2009 | Lu | G02F 1/13624 345/214 |
| 2010/0007639 | A1 | 1/2010 | Jeong | |
| 2014/0022221 | A1* | 1/2014 | Furihata | G09G 3/003 345/204 |
| 2016/0203769 | A1* | 7/2016 | Lee | G09G 3/20 345/690 |
| 2017/0090624 | A1* | 3/2017 | Kwon | G06F 3/0416 |
| 2017/0269447 | A1* | 9/2017 | Du | G02F 1/1368 |

FOREIGN PATENT DOCUMENTS

| | | | |
|---|---|---|---|
| CN | 102347005 | A | 2/2012 |
| CN | 104751817 | A | 7/2015 |
| JP | 2006139255 | A | 6/2006 |

* cited by examiner

LIQUID CRYSTAL DISPLAY AND METHOD OF IMPROVING COLOR SHIFT ARISED FROM LARGE VIEW ANGLE

BACKGROUND

1. Field of the Disclosure

The present disclosure relates to the field of a liquid crystal display (LCD), and more particularly, to an LCD and a method of improving a color shift from a large view angle of the LCD.

2. Description of the Related Art

Recently, an LCD has almost become a substitution for a conventional cathode ray tube (CRT) display owing to merits of small size, light weight, high-quality display, and so on. However, the LCD has an inherent defect. When a view angle becomes large, the brightness curve of each pixel cannot conform to the gamma value of 2.2. It results in a color shift; that is, the larger the view angle is, the more obvious the color shift demonstrates. FIG. 1 illustrates brightness curves at different view angles. It is obvious that the gamma value of the brightness curve of the pixel is 2.2 at the view angle of zero degrees while the gamma value of the brightness curve of the pixel is far from 2.2 at the view angle of 30 degrees and 60 degrees.

A conventional method of solving the problem of the large view angle is as follows: Each of the pixels in a display array of a liquid crystal display is divided into two sections—a master area and a slave area. The master area and the slave area are supplied with different grayscales at the same time to make the deflection angle of liquid crystal in the master area and the deflection angle of liquid crystal in the slave area different. Accordingly, the gamma value of the brightness curve for the master area is different from the gamma value of the brightness curve for the slave area. Once a view angle becomes large, the gamma value of the brightness curve for the master area and the gamma value of the brightness curve for the slave area vary as well. After the gamma value of the brightness curve for the master area and the gamma value of the brightness curve for the slave area are neutralized, a gamma value of the brightness curve for the whole pixel approaches 2.2. Therefore, the color shift from a large view angle is corrected. However, an additional scan line, an additional data line, and an additional thin-film transistor (TFT) are required though the problem of the color shift from a large view angle is improved. It is obvious that, on one hand, the production costs increase; on the other hand, the aperture rate of the liquid crystal panel and transmittance are lowered.

SUMMARY

An object of the present disclosure is to propose a liquid crystal display (LCD) and a method of improving a color shift from a large view angle of the LCD to solve the problems that the production costs are high and the ROP of a liquid crystal panel is low using a conventional method of reducing the color shift from a large view angle.

According to the present disclosure, a liquid crystal display (LCD) includes: a timing controller, configured to transmit data including a gamma value corresponding to a pending frame to a source driver integrated circuit (IC); the source driver IC, configured to generate grayscale voltages supplied to pixels of a liquid crystal panel based on a gamma value corresponding to the pending frame and the grayscales of the pixels corresponding to the pending frame; the liquid crystal panel, configured to show the pending frame based on the grayscale voltages supplied to each of the pixels. The gamma value corresponding to the pending frame is different from the gamma value corresponding to adjacent frames.

Optionally, the gamma value corresponding to the pending frame is different from a gamma value corresponding to a previous frame and is different from the gamma value corresponding to a following frame. The gamma value corresponding to the previous frame is the same as the gamma value corresponding to the following frame.

Optionally, the source driver IC includes: a receiver, configured to receive the data including the gamma value corresponding to the pending frame corresponds to from the timing controller and analyze the gamma value corresponding to the pending frame; a gamma controller, configured to generate the grayscale voltages supplied to the pixels to show the pending frame, based on the gamma value corresponding to the pending frame and the grayscale voltages; and an analog-to-digital converter (ADC), configured to convert the grayscale voltages into analog voltages.

Optionally, the timing controller transmits the data including the gamma value corresponding to the pending frame to the source driver IC according to a communication protocol.

Optionally, the timing controller transmits the data including the gamma value corresponding to the pending frame to the source driver IC according to a communication protocol.

Optionally, the communication protocol is a peer-to-peer (P2P) communication protocol.

According to the present disclosure, a method of improving color shift of a liquid crystal display (LCD) arose from large view angle includes: (A) transmitting, with a timing controller, data including a gamma value corresponding to a pending frame to a source driver integrated circuit (IC); (B) generating, with the source driver IC, grayscale voltages supplied to pixels of a liquid crystal panel based on a gamma value corresponding to the pending frame and the grayscales of the pixels corresponding to the pending frame; (C) showing, with the liquid crystal panel, the pending frame on based on the grayscale voltages supplied to each of the pixels. The gamma value corresponding to the pending frame is different from the gamma value corresponding to adjacent frames.

Optionally, the gamma value corresponding to the pending frame is different from a gamma value corresponding to a previous frame and is different from the gamma value corresponding to a following frame. The gamma value corresponding to the previous frame is the same as the gamma value corresponding to the following frame.

Optionally, the step (B) includes: (b1) receiving, with a receiver, the data including the gamma value corresponding to the pending frame corresponds to from the timing controller and analyze the gamma value corresponding to the pending frame; (b2) generating, with a gamma controller, the grayscale voltages supplied to the pixels to show the pending frame, based on the gamma value corresponding to the pending frame and the grayscale voltages; and (b3) converting, with an analog-to-digital converter (ADC), the grayscale voltages into analog voltages.

Optionally, the timing controller transmits the data including the gamma value corresponding to the pending frame to the source driver IC according to a communication protocol.

Optionally, the communication protocol is a peer-to-peer (P2P) communication protocol.

Adopting the LCD and the method of reducing the color shift from a large view angle of an LCD proposed by the present disclosure can greatly lower the color shift from a large view angle and enlarge a view angle without increasing the production costs or lowering the ROP of a liquid crystal panel.

These and other features, aspects and advantages of the present disclosure will become understood with reference to the following description, appended claims and accompanying figures.

DETAILED DESCRIPTION OF THE PREFERRED EMBODIMENTS

For better understanding embodiments of the present disclosure, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

Figure 1:
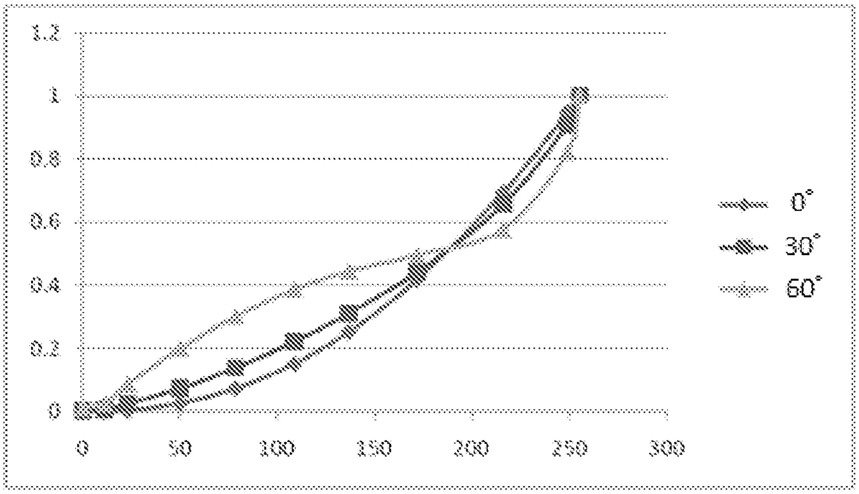
FIG. 1 illustrates brightness curves at different view angles.
Figure 2:
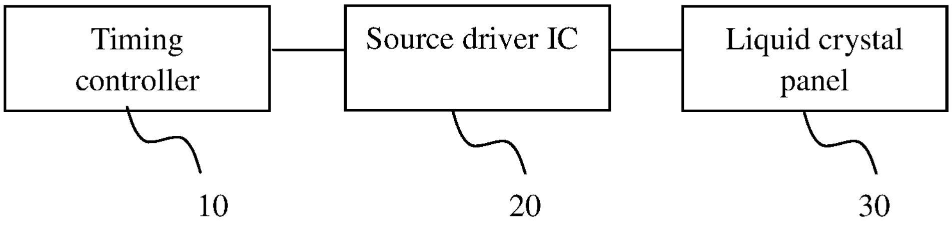
FIG. 2 is a block diagram illustrating a liquid crystal display (LCD) according to one preferred embodiment of the present disclosure.

FIG. 2 is a block diagram illustrating a liquid crystal display (LCD) according to one preferred embodiment of the present disclosure. The LCD includes a timing controller 10, a source driver integrated circuit (IC) 20, and a liquid crystal panel 30.

In addition to the timing controller 10, the source driver IC 20, and the liquid crystal panel 30, the LCD further includes any other components which have key functions in the LCD. The present disclosure does not have any limits to these components.

The timing controller 10 transmits the data including a gamma value corresponding to a pending frame, to the source driver IC 20.

The timing controller 10 transmits the data including the gamma value corresponding to the pending frame to the source driver IC 20 according to a communication protocol. Preferably, the communication protocol is a peer-to-peer (P2P) communication protocol. For example, the P2P communication protocol may be the USI-T protocol advocated by SAMSUNG®, the ISP protocol advocated by LG®, or the PHI protocol advocated by NOVATEK®.

The source driver IC 20 generates a grayscale voltage supplied to each of the pixels in the liquid crystal panel 30 based on the gamma value that the pending frame corresponds to and the grayscale voltage that each of the pixels corresponds to in the liquid crystal panel 30 where the pending frame is shown. The gamma value that the pending frame corresponds to is different from the gamma value that an adjacent frame corresponds to. That is, the gamma value that the pending frame corresponds to is different from the gamma value that a previous frame corresponds to and is different from the gamma value that a following frame corresponds to.

Preferably, the gamma value that the pending frame corresponds to is different from the gamma value that a previous frame corresponds to and is different from the gamma value that a following frame corresponds to. Besides, the gamma value that the previous frame corresponds to is the same as the gamma value that the following frame corresponds to. Specifically, the gamma value that each of the odd frames corresponds to is the same (such as the first gamma value). And the gamma value that each of the even frames corresponds to is the same (such as the second gamma value). The first gamma value and the second gamma value can be determined and set based on a practical condition. For example, the first gamma value and the second gamma value are determined and set at, for example, 1.8 for the first gamma value and 2.3 for the second gamma value, after practical measurement and tuning.

The liquid crystal panel 30 shows a pending frame based on the grayscale voltage supplied to each of the pixels.

Figure 3:
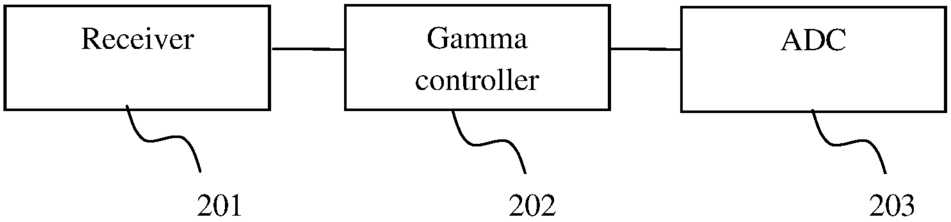
FIG. 3 is a block diagram illustrating the source driver IC according to the preferred embodiment of the present disclosure.

FIG. 3 is a block diagram illustrating the source driver IC 20 according to the preferred embodiment of the present disclosure. The source driver IC 20 comprises a receiver 201, a gamma controller 202, and an analog-to-digital converter (ADC) 203.

In addition to the receiver 201, the gamma controller 202, and the ADC 203, the source driver IC 20 further includes any other components which have key functions as the source driver IC 20 does in the LCD. The present disclosure does not have any limits to these components.

The receiver 201 receives the data including the gamma value that the pending frame corresponds to from the timing controller and analyzes the gamma value that the pending frame corresponds to from the received data.

The gamma controller 202 generates grayscale voltages supplied to the pixels based on the gamma value that the pending frame corresponds to and the grayscale voltages that the pixels correspond to in the liquid crystal panel 30 where the pending frame is shown.

The ADC 203 converts the grayscale voltages generated for the pixels into analog voltages.

The timing controller 10 transmits the data which the frame corresponds to the source driver IC 20 when a frame is ready to be shown. Therefore, the source driver IC 20 supplies each of the pixels in the liquid crystal panel with a corresponding grayscale voltage based on the gamma value that the frame corresponds to so that the frame can be shown. Correspondingly, the timing controller 10 transmits the data which a following frame corresponds to the source driver IC 20 when the following frame is ready to be shown. Therefore, the source driver IC 20 supplies each of the pixels in the liquid crystal panel with a corresponding grayscale voltage based on the gamma value that the following frame corresponds to so that the following frame can be shown. When the one frame and the following frame are shown on the liquid crystal panel 30, the optical curve of the pixel in the liquid crystal panel 30 is different even though the pixel is at the same place. It is because the gamma value that the one frame corresponds to is different from the gamma value that the following frame corresponds to. Through human visual integral, the two brightness curves are neutralized exactly to be a brightness curve with a gamma value approaching 2.2. Therefore, the color shift from a large view angle is lowered. Besides, the higher the frame rate of the liquid crystal panel 30 is, the more obvious effect of a lower color shift from a large view angle shows.

Also, the above-mentioned components further have other functions as a part of the LCD except the above-mentioned functions. Take the timing controller 10 for example. In addition to transmitting the gamma value that the pending frame corresponds to the source driver IC 20, the timing controller 10 transmits the grayscale voltages that each of the pixels in the liquid crystal panel 30 where the pending frame shows corresponds to the source driver IC 20.

When the LCD proposed by the present disclosure is adopted, neither additional components nor additional technical support is required. The conventional components in the conventional LCD and the conventional P2P communication structure are available and useful. It is unnecessary to add costs and realization is more convenient when the LCD proposed by the present disclosure is applied.

Figure 4:
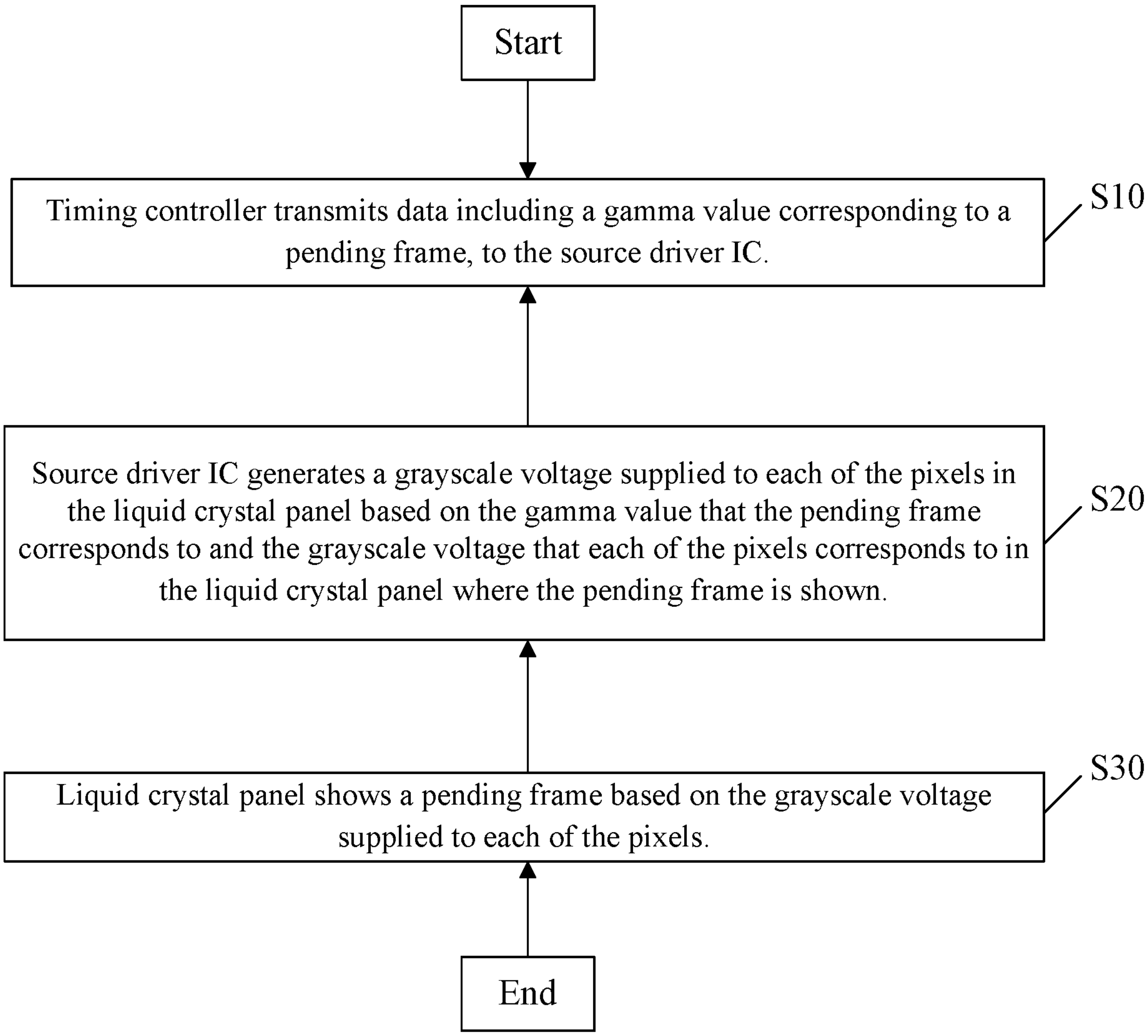
FIG. 4 is a flow chart illustrating a method of improving a color shift from a large view angle of an LCD according to one preferred embodiment of the present disclosure.

FIG. 4 is a flow chart illustrating a method of improving a color shift from a large view angle of a liquid crystal display (LCD) according to one preferred embodiment of the present disclosure.

At block S10, the timing controller 10 transmits the data including a gamma value corresponding to a pending frame, to the source driver IC 20.

The timing controller 10 transmits the data including the gamma value corresponding to the pending frame to the source driver IC 20 according to a communication protocol. Preferably, the communication protocol is a peer-to-peer (P2P) communication protocol. For example, the P2P communication protocol may be the USI-T protocol advocated by SAMSUNG®, the ISP protocol advocated by LG®, or the PHI protocol advocated by NOVATEK®.

At block S20, the source driver IC 20 generates a grayscale voltage supplied to each of the pixels in the liquid crystal panel 30 based on the gamma value that the pending frame corresponds to and the grayscale voltage that each of the pixels corresponds to in the liquid crystal panel 30 where the pending frame is shown. The gamma value that the pending frame corresponds to is different from the gamma value that an adjacent frame corresponds to. That is, the gamma value that the pending frame corresponds to is different from the gamma value that a previous frame corresponds to and is different from the gamma value that a following frame corresponds to.

Preferably, the gamma value that the pending frame corresponds to is different from the gamma value that a previous frame corresponds to and is different from the gamma value that a following frame corresponds to. Besides, the gamma value that the previous frame corresponds to is the same as the gamma value that the following frame corresponds to. Specifically, the gamma value that each of the odd frames corresponds to is the same (such as the first gamma value). And the gamma value that each of the even frames corresponds to is the same (such as the second gamma value). The first gamma value and the second gamma value can be determined and set based on a practical condition. For example, the first gamma value and the second gamma value are determined and set at, for example, 1.8 for the first gamma value and 2.3 for the second gamma value, after practical measurement and tuning.

At block S30, the liquid crystal panel 30 shows a pending frame based on the grayscale voltage supplied to each of the pixels.

Figure 5:
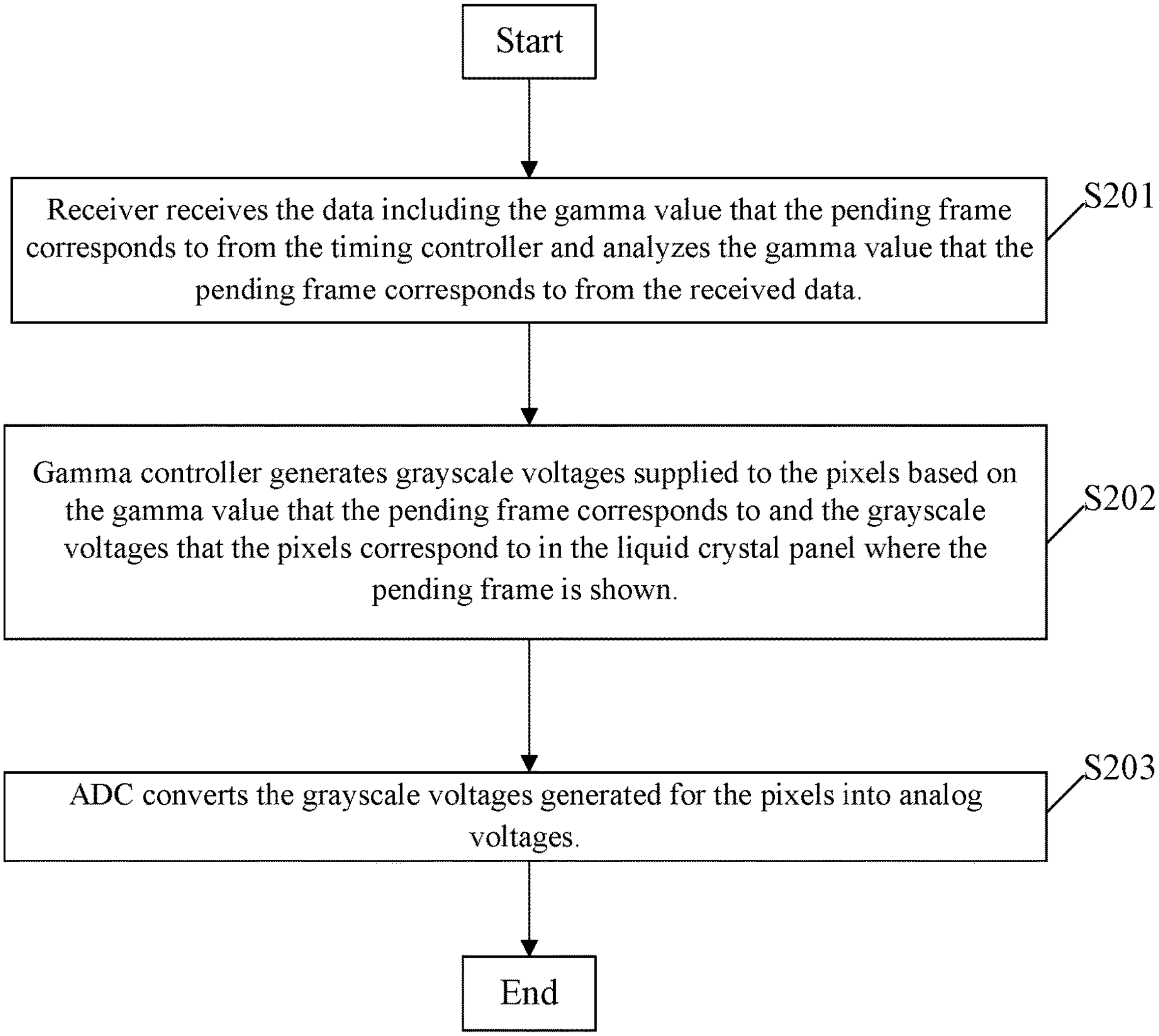
FIG. 5 is a flow chart illustrating a method of generating a grayscale voltage according to one preferred embodiment of the present disclosure.

FIG. 5 is a flow chart illustrating a method of generating a grayscale voltage according to one preferred embodiment of the present disclosure.

At block S201, the receiver 201 receives the data including the gamma value that the pending frame corresponds to from the timing controller and analyzes the gamma value that the pending frame corresponds to from the received data.

At block S202, the gamma controller 202 generates grayscale voltages supplied to the pixels based on the gamma value that the pending frame corresponds to and the grayscale voltages that the pixels correspond to in the liquid crystal panel 30 where the pending frame is shown.

At block S203, the ADC 203 converts the grayscale voltages generated for the pixels into analog voltages.

According to the embodiment of the method of improving color shift of an LCD arose from large view angle, the timing controller 10 transmits the data which the frame corresponds to the source driver IC 20 when a frame is ready to be shown. Therefore, the source driver IC 20 supplies each of the pixels in the liquid crystal panel with a corresponding grayscale voltage based on the gamma value that the frame corresponds to so that the frame can be shown. Correspondingly, the timing controller 10 transmits the data which a following frame corresponds to the source driver IC 20 when the following frame is ready to be shown. Therefore, the source driver IC 20 supplies each of the pixels in the liquid crystal panel with a corresponding grayscale voltage based on the gamma value that the following frame corresponds to so that the following frame can be shown. When the one frame and the following frame are shown on the liquid crystal panel 30, the optical curve of the pixel in the liquid crystal panel 30 is different even though the pixel is at the same place. It is because the gamma value that the one frame corresponds to is different from the gamma value that the following frame corresponds to. Through human visual integral, the two brightness curves are neutralized exactly to be a brightness curve with a gamma value approaching 2.2. Therefore, the color shift from a large view angle is lowered. Besides, the higher the frame rate of the liquid crystal panel 30 is, the more obvious effect of a lower color shift from a large view angle shows.

When the LCD proposed by the present disclosure is adopted, neither additional components nor additional technical support is required. The conventional components in the conventional LCD and the conventional P2P communication structure are available and useful. It is unnecessary to add costs and realization is more convenient when the LCD proposed by the present disclosure is applied.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A liquid crystal display (LCD), comprising:

a timing controller, configured to transmit data including only one gamma value corresponding to a pending frame to a source driver integrated circuit (IC);

the source driver IC, configured to generate grayscale voltages supplied to pixels of a liquid crystal panel based on the gamma value corresponding to the pending frame and the grayscales of the pixels corresponding to the pending frame;

the liquid crystal panel, configured to show the pending frame based on the grayscale voltages supplied to each of the pixels;

wherein the gamma value corresponding to the pending frame is different from the gamma value corresponding to adjacent frames, wherein the timing controller transmits the data including the gamma value corresponding to the pending frame to the source driver IC according to an USI-T protocol or an ISP protocol, or a PHI protocol.

2. The LCD of claim 1, wherein the gamma value corresponding to the pending frame is different from a gamma value corresponding to a previous frame and is different from the gamma value corresponding to a following frame; and the gamma value corresponding to the previous frame is the same as the gamma value corresponding to the following frame.

3. The LCD of claim 1, wherein the source driver IC comprises:

a receiver, configured to receive the data including the gamma value corresponding to the pending frame corresponds to from the timing controller and analyze the gamma value corresponding to the pending frame;

a gamma controller, configured to generate the grayscale voltages supplied to the pixels to show the pending frame, based on the gamma value corresponding to the pending frame and the grayscale voltages; and an analog-to-digital converter (ADC), configured to convert the grayscale voltages into analog voltages.

4. The LCD of claim 2, wherein the source driver IC comprises:

a receiver, configured to receive the data including the gamma value corresponding to the pending frame corresponds to from the timing controller and analyze the gamma value corresponding to the pending frame;

a gamma controller, configured to generate the grayscale voltages supplied to the pixels to show the pending frame, based on the gamma value corresponding to the pending frame and the grayscale voltages; and an analog-to-digital converter (ADC), configured to convert the grayscale voltages into analog voltages.

5. A method of improving color shift of a liquid crystal display (LCD) arisen from large view angle, comprising:

(A) transmitting, with a timing controller, data including only one gamma value corresponding to a pending frame to a source driver integrated circuit (IC);

(B) generating, with the source driver IC, grayscale voltages supplied to pixels of a liquid crystal panel based on the gamma value corresponding to the pending frame and the grayscales of the pixels corresponding to the pending frame;

(C) showing, with the liquid crystal panel, the pending frame on based on the grayscale voltages supplied to each of the pixels;

wherein the gamma value corresponding to the pending frame is different from the gamma value corresponding to adjacent frames, wherein the timing controller transmits the data including the gamma value corresponding to the pending frame to the source driver IC according to an USI-T protocol or an ISP protocol, or a PHI protocol.

6. The method of claim 5, wherein the gamma value corresponding to the pending frame is different from a gamma value corresponding to a previous frame and is different from the gamma value corresponding to a following frame; and the gamma value corresponding to the previous frame is the same as the gamma value corresponding to the following frame.

7. The method of claim 5, wherein the step (B) comprises:

(b1) receiving, with a receiver, the data including the gamma value corresponding to the pending frame corresponds to from the timing controller and analyze the gamma value corresponding to the pending frame;

(b2) generating, with a gamma controller, the grayscale voltages supplied to the pixels to show the pending frame, based on the gamma value corresponding to the pending frame and the grayscale voltages; and (b3) converting, with an analog-to-digital converter (ADC), the grayscale voltages into analog voltages.

8. The method of claim 6, wherein the step (B) comprises:

(b1) receiving, with a receiver, the data including the gamma value corresponding to the pending frame corresponds to from the timing controller and analyze the gamma value corresponding to the pending frame;

(b2) generating, with a gamma controller, the grayscale voltages supplied to the pixels to show the pending frame, based on the gamma value corresponding to the pending frame and the grayscale voltages; and (b3) converting, with an analog-to-digital converter (ADC), the grayscale voltages into analog voltages.

* * * * *